Oct. 12, 1948.  J. J. KOOMAN  2,451,096
METHOD OF PREPARING CANDY COATED CONFECTIONS
Filed April 3, 1946  2 Sheets-Sheet 1

Inventor:
Jacob J. Kooman

Inventor:
Jacob J. Kooman

Patented Oct. 12, 1948

2,451,096

UNITED STATES PATENT OFFICE 2,451,096

METHOD OF PREPARING CANDY COATED CONFECTIONS

Jacob J. Kooman, Chicago, Ill., assignor to Confections, Inc., Chicago, Ill., a corporation of Illinois Application April 3, 1946, Serial No. 659,337

6 Claims. (Cl. 107—54)

The invention relates to a method of preparing candy coated confections and has reference in particular to an improved method for coating popcorn with caramel and for inhibiting the individual candy units from lumping or sticking together until sufficient cooling has taken place to insure continued separation of the candied units.

In my Patent No. 2,425,942, granted August 19, 1947, and entitled Confectionery making machine I disclose a cylindrical mixing container open at the top and having a closure member in the form of a flat disc pivotally secured thereto at the bottom so as to rotate with the container upon rotation of the same and wherein the flat disc can be actuated to open or closed position during such rotary movement. In the coating of popcorn or cereal, for example, the same is delivered to the container through the open top and hot melted caramel is then poured over the material in the container and the whole is thoroughly mixed by any suitable means such as a rotating screw member having motion in a direction opposite to that of the container. The caramel coated kernels tend to adhere or stick to each other to form a solid mass or accumulations of large size and which must be immediately separated into individual candied units and maintained in separated relation until sufficient cooling has taken place to insure continued separation of the units.

An object of the present invention resides in the provision of an improved method for preparing coated confections as above described and which will effectively maintain the candied units individually separated throughout the cooling operation.

Another object of the invention resides in the provision of a method as above described which contemplates the addition of an edible oil or melted fat to the caramel coated confection in the mixing container for initially wetting the same, thereby facilitating the separation of the individual units and which separated units are then agitated in a manner to maintain their separated relation during the cooling step.

The edible oil or melted fat, which may be collectively termed a shortening ingredient, is preferably added to the confection in the form of a fine spray and its effect is to lubricate the candied popcorn or cereal so as to inhibit any tendency toward accumulating or lumping of the units. In this connection, another object of the invention resides in the use of a small quantity of lecithin, that is, phosphatides for reducing surface tension and viscosity, thereby improving the spreading action of the shortening and which increases its lubricating effect.

Another object having to do with the addition of a shortening ingredient to the caramel coated confection for the purposes mentioned resides in the use of a relatively small quantity of lecithin for reducing the quantity of shortening which would otherwise be required to obtain a satisfactory lubricating effect.

Another object of the invention resides in a combined cooling, agitating and sifting operation for caramel coated confections for the purpose of separating and breaking up accumulations into individual candied units and which will also maintain any such units in their separated condition.

With these and other objects in view the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1:
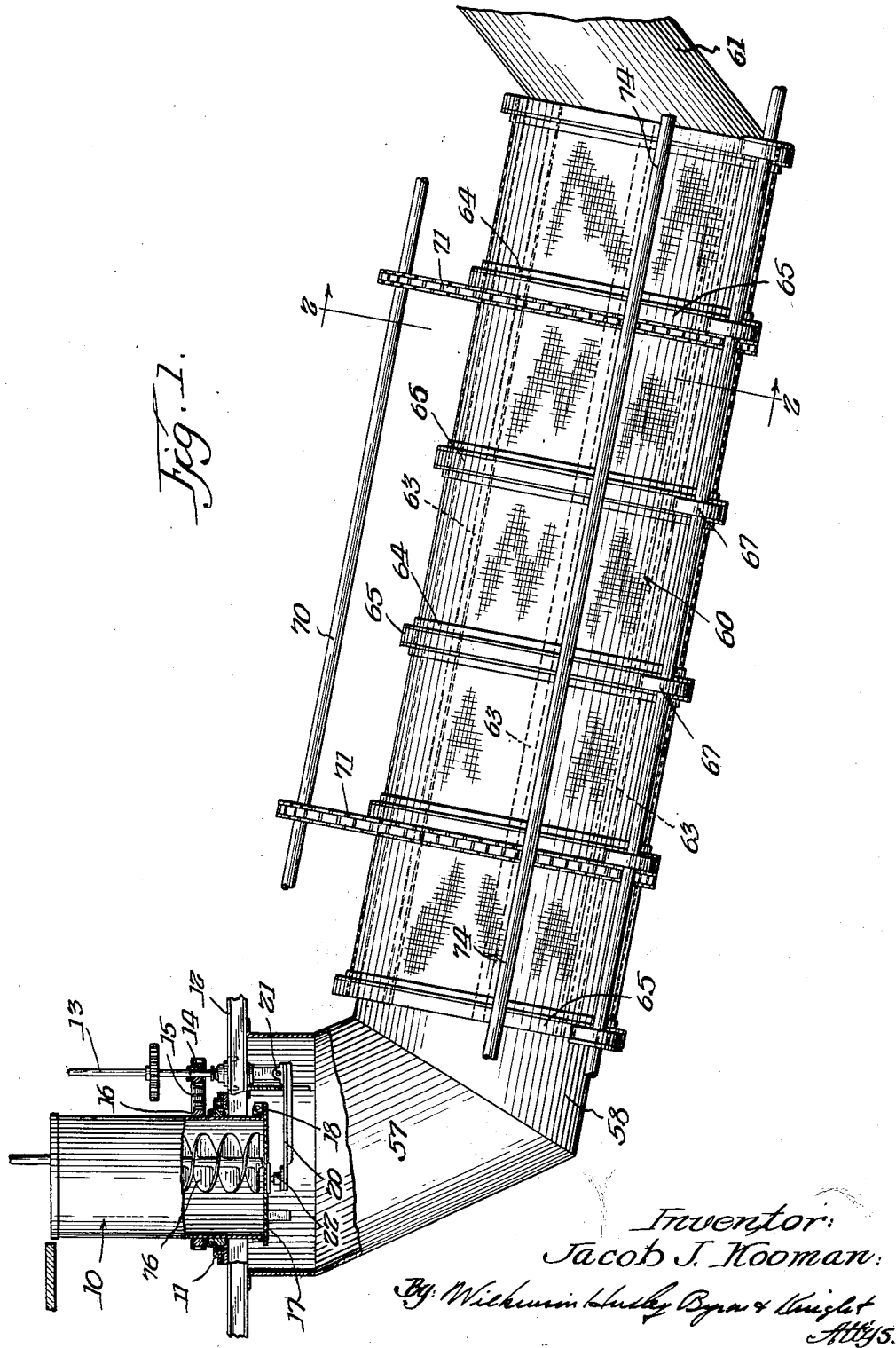
Figure 1 is an elevational view, parts being shown in section, illustrating a form of apparatus suitable for carrying out the present process.

Referring to the drawings, the cylindrical mixing container 10 is suitably mounted for rotation on a vertical axis by the member 11 which is supported by beams 12, the lower end of the container depending below the said beams 12, as clearly shown in the drawings, to facilitate discharge of the same. The container is suitably rotated by the driving shaft 13 having the pinion 14 which operatively connects by means of the drive chain 15 with the sprocket ring 16 secured to and encircling the cylinder. The closure member, in the form of a flat disc is indicated by numeral 17, the same having pivotal securement as at 18 to the bottom of the container exteriorly thereof so that the disc 17 will rotate with the container and whereby it may be opened and closed during such movement. Means for controlling the opening and closing movements of the flat disc 17 comprises a lever 20 pivotally secured to supporting structure depending from beam 12 by means of shaft 21 and having at its free end the ball member 22. Said ball member 22 is maintained in contact with the center of disc 17 and by actuation of lever 20 the disc is held closed although rotation of the mixing container is permitted. For opening the disc, shaft 21 is actuated to relieve pressure on the disc, whereupon the same will open automatically by gravity.

The depending end of the container 10 and associated structure pertaining to the closure member are entirely enclosed by the hopper structure 57 having a substantially horizontal discharge conduit 58 which delivers the caramel coated confection to a tumbling barrel indicated in its entirety by numeral 60. At the end of the tumbling barrel opposite conduit 58 a similar conduit member 61 is provided within which is located suitable mechanism for removing the confection from the barrel, the same having been cooled during its travel through the barrel whereby the confection is ready for packaging.

Figure 2:
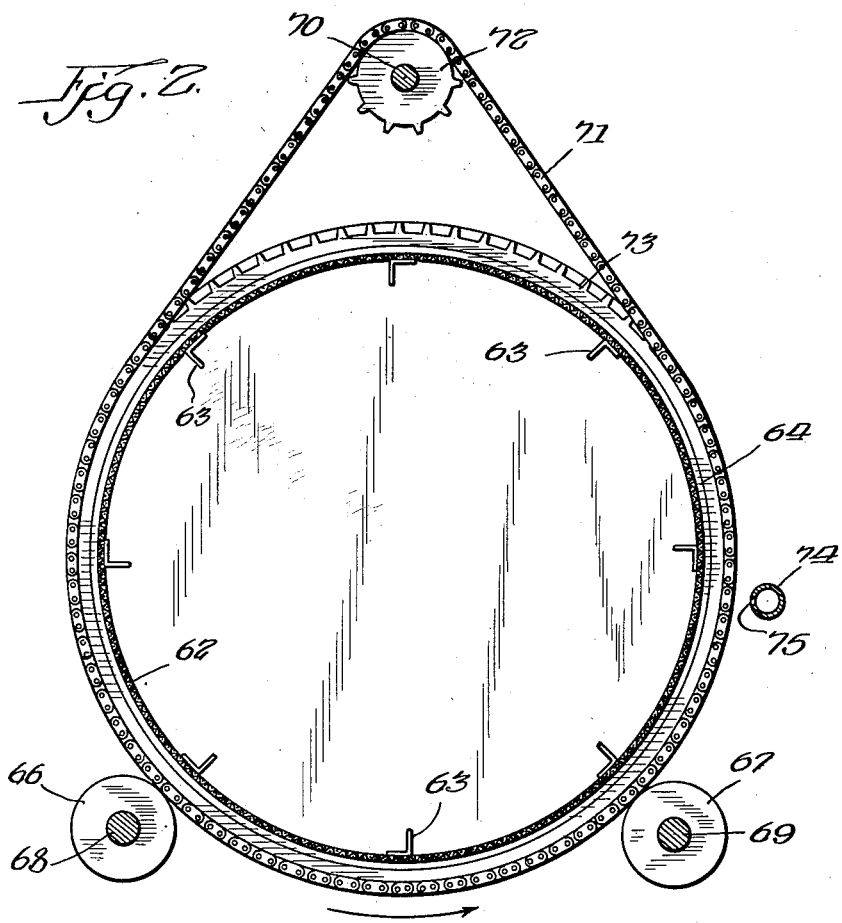
Figure 2 is a transverse sectional view taken substantially on line 2—2 of Figure 1.
Figure 3:
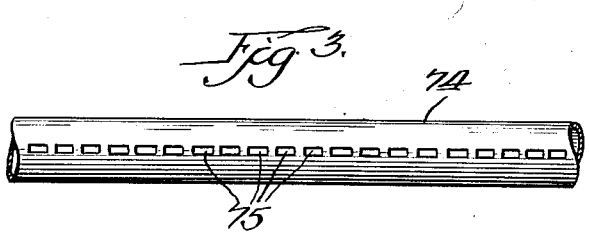
Figure 3 is a fragmentary elevational view illustrating the arrangement of air openings in the blower pipe.

The tumbling barrel essentially consists of a cylindrical frame of wire mesh screening 62, as best shown in Figure 2. On the inside of the barrel the screening is reinforced by the angle pieces 63 located in spaced relation around the inside circumference of the barrel. The angle pieces 63 are suitably secured to metal bands 64 having encircling relation with the exterior of the metal screen so that the resulting framework is sufficiently rugged and durable for performing its required functions. However, rigidity of the barrel is further increased by the metal rims 65 suitably secured to metal bands 64 and which rims provide the necessary supporting structure for supporting the barrel for rotation on the rollers 66 and 67 disposed on the respective sides of the barrel. Rollers 66 are fixed to a longitudinally extending shaft 68 and which has an inclination in a downward direction between conduit 58 and conduit 61. Rollers 67 are similarly fixed to a longitudinally extending shaft 69 and which likewise is inclined downwardly in parallel with that of shaft 68. The rollers support the tumbling barrel for rotation, the same being driven from the driving shaft 70 by one or more driving chains 71. The pinions 72 are fixed to driving shaft 70 and sprockets 73 are suitably fixed to the barrel, the same having encircling relation with the exterior thereof. The driving chains 71 operatively connect the pinions 72 with sprockets 73 whereby power is transmitted from driving shaft 70 to effect rotation of the tumbling barrel at the desired speed.

As shown in Figure 2, an air pipe 74 is disposed adjacent one side of the tumbling barrel and suitably supported in position by means not shown. Air under pressure is supplied to the pipe and by means of openings 75, extending longitudinally of the pipe on the side adjacent the barrel, the compressed air is discharged and its effect is to cool the caramel coated confection during its travel through the tumbling barrel in a manner as will be more particularly described.

The first step in the present method of producing caramel coated popcorn, for example, resides in mixing the popped popcorn and hot caramel syrup in the container 10, the step being facilitated by the mixing screw 76, which has rotation in a direction opposite to that of the container. More particularly, the mixing screw 76 may be rotated at a speed in excess of that of the container and in a direction to cause travel of the mixture upwardly. When the mixture leaves the screw at its upper end it drops downwardly by gravity and the operation is repeated many times in order to thoroughly and uniformly coat the popcorn units with the caramel. An edible oil or melted fat, collectively termed a shortening ingredient, is added in the form of a fine spray to the mixture for the purpose of lubricating the caramel coated units whereby to inhibit any tendency toward sticking or lumping together to form large masses or accumulations. Any edible animal or vegetable oil or fat may be used, such as mineral oil or cottonseed oil, the selection being controlled somewhat by the odor and flavor of the shortening and its efficiency as a wetting agent. Certain fats and oils are frequently preferred because of their superior flavor, better keeping qualities, and greater uniformity.

For maximum economy the invention contemplates the addition of a small amount of lecithin to the quantity of shortening sprayed upon the mixture in the container. Lecithin is known to have modifying effects on oils in which it is dissolved, reducing surface tension and viscosity to thereby improve the oil's tendency to spread. Although animal and vegetable oils in the crude state and even after partial refining contain some lecithin it has been found desirable to increase the lecithin content above that normally present by the addition of approximately 0.6% by volume to enhance the spreading and wetting qualities of the shortening. With such additions of lecithin the amount of oil required for satisfactory wetting has been found to be reduceable by as much as twenty to fifty per cent. The economy thus effected is an important consideration in the present method since the shortening is an expensive ingredient. The value of the lecithin addition is even more evident when costly refined fatty materials with negligible natural lecithin content and relatively poor spreading qualities are used. Hydrogenated fatty material has been found to benefit by lecithin addition and this step in the method is recommended when hydrogenated oils are used.

For discharging the caramel coated mixture from the container 10 the bottom disc 17 is permitted to open, whereupon the material is satisfactorily discharged since the container continues to rotate and centrifugal action facilitates outward discharge of the material through the opening provided between the container and the disc. The material entering the hopper structure 57 consists of caramel coated popcorn units and accumulations of various size formed as a result of the units sticking and lumping together. Also the temperature of the mass is in the neighborhood of from 250 to 275 degrees Fahr. It is necessary that the accumulations be broken up, with each and every popcorn unit being separated, and all of the separated units being maintained in this condition until sufficient cooling has taken place. The tumbling barrel 60 receives the caramel coated material from the hopper structure 57 and a continuous agitating and cooling step is performed during progress of the material longitudinally of the barrel. It will be understood that the material progresses along the length of the barrel in a direction toward the right, Figure 1, as a result of the inclination of the same. However, during this travel the material is agitated as a result of the angle pieces 63 located in spaced relation on the inside circumference of the barrel. These angle pieces serve the purpose of carrying the caramel coated units to a level approximately horizontal or slightly beyond where they are caused to drop by gravity to the bottom of the barrel. In combination with the agitation caused by the rotary movement of the barrel in a counter-clockwise direction, Figure 2, and the agitation as a result of dropping of the material from the angle pieces 63, a cooling step is performed by the compressed air issuing from pipe 74 through openings 75 extending longitudinally of the same. It will be seen that pipe 74 is located adjacent the tumbling barrel on the right hand side thereof, Figure 2, whereby the air streams are caused to impinge upon the caramel coated product as the same is caused to collect on this side of the tumbling barrel due to the direction of rotation of the barrel and angle pieces 63. In fact, the popcorn supported on the angle pieces 63, which are being elevated thereby, are immediately blown off of said angle pieces as they pass the location of the air jets.

The product is accordingly cooled by the transverse air currents and which also assists in maintaining the caramel coated confection in separated condition. A sifting action also takes place during travel of the confection from one end of the tumbling barrel to the other. Small pieces of popcorn and hardened pieces of caramel which may have broken off from the coated units are sifted as a result of the wire mesh screening of the tumbling container. The product reaching the discharge end 61 is therefore not only cleaner than the product delivered to the tumbling barrel but the same has been sufficiently cooled, with all the units being maintained in separated relation so that there is no further tendency for them to adhere to each other.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a method of preparing candy coated popcorn, the steps which consist in coating the popcorn units with a melted caramel, spraying the caramel coated units with a shortening ingredient to which has been added lecithin in an amount not greater than one per cent by volume, whereby to wet the surface of the coated units and inhibit any tendency of the same to adhere or stick together and form accumulations, agitating the coated units to break up any accumulations which may exist and to maintain the separated units in separated condition, and subjecting the units during the agitating step to air currents for cooling purposes.

2. In a method of preparing candy coated popcorn, the steps which consist in coating the popcorn units with a melted caramel, spraying the caramel coated units with a shortening ingredient, whereby to wet the surface of the coated units and inhibit any tendency to stick together and form accumulations, agitating the coated units and simultaneously subjecting them to a sifting action, and subjecting the units during said agitating and shifting step to air currents for cooling purposes.

3. In a method of preparing a confection, the steps which consist in coating the individual confection units with a hot liquid syrup by adding the syrup to the units while in a confined state, stirring the mass of coated units, adding a shortening ingredient to the syrup-coated units for inhibiting any tendency of the coated units to adhere or stick together and form accumulations, discharging the coated units from said confined state, agitating the discharged units, and subjecting the same to air currents during said agitating step.

4. In a method of preparing a confection, the steps which consist in coating the individual confection units with a hot liquid syrup by adding the syrup to the units while in a confined state, rotating the mass of coated units and stirring, spraying a shortening ingredient onto the syrup-coated units to wet their surface whereby to inhibit any tendency of the coated units to adhere or stick together and form accumulations, discharging the coated units from said confined state, agitating the discharged units, and subjecting the same to air currents during said agitating step, the said agitating step and the step of subjecting the units to air currents being continued until cooling of the units has taken place sufficient to prevent any further sticking to form accumulations.

5. In a method of preparing a confection, the steps which consist in coating the individual confection units with hot melted caramel by adding the caramel to the units while in a confined state, rotating the mass of coated units and stirring, spraying a shortening ingredient onto the syrup-coated units to wet their surface whereby to inhibit any tendency of the coated units to adhere or stick together and form accumulations, discharging the coated units from said confined state, delivering the discharged units to a second state of confinement, tumbling and agitating the units while progressively moving them through said second state of confinement, and subjecting the units during said agitating step to transverse air currents, the said agitating step and the step of subjecting the units to transverse air currents being continued until cooling of the units has taken place sufficient to prevent any further sticking to form accumulations.

6. In a method of preparing candy coated popcorn, the steps which consist in coating the popcorn units with a melted caramel by pouring the caramel over the units while in a confined state, spraying the caramel-coated units with a shortening ingredient to which has been added a small quantity of lecithin, whereby to wet the surface of the coated units and inhibit any tendency of the same to adhere or stick together and form accumulations, discharging the coated units from said confined state, agitating the discharged units, and subjecting the same to cool air currents during said agitating step.

JACOB J. KOOMAN.

REFERENCES CITED

The following references are of record in the file of this patent:

UNITED STATES PATENTS

| Number | Name | Date |
|---|---|---|
| 1,879,927 | Eakins | Sept. 27, 1932 |